(No Model.)

T. DOWNWARD.
SPINNING MACHINE.

No. 461,628. Patented Oct. 20, 1891.

Witnesses
John Imirie
R. W. Bishop.

Inventor
Thomas Downward
By his Attorney
W. W. Catmore

UNITED STATES PATENT OFFICE.

THOMAS DOWNWARD, OF PHILADELPHIA, PENNSYLVANIA, ASSIGNOR OF ONE-HALF TO THOMAS H. DOWNWARD, OF WASHINGTON, DISTRICT OF COLUMBIA.

SPINNING-MACHINE.

SPECIFICATION forming part of Letters Patent No. 461,628, dated October 20, 1891.

Application filed January 20, 1891. Serial No. 378,388. (No model.)

*To all whom it may concern:*

Be it known that I, THOMAS DOWNWARD, a citizen of the United States, residing at Philadelphia, in the county of Philadelphia and State of Pennsylvania, have invented certain new and useful Improvements in Spinning-Machines, of which the following is a specification, reference being had therein to the accompanying drawings.

My present invention has especial reference to improvements on the machine for which Letters Patent No. 306,815 were granted to me on October 21, 1884; and it consists in certain novel features hereinafter first fully described, and then particularly pointed out in the claim.

Figure 1:
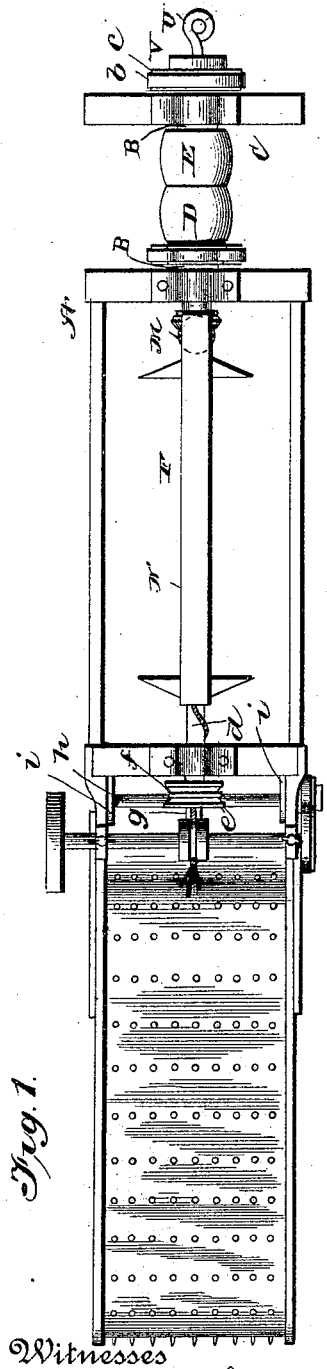
Figure 2:
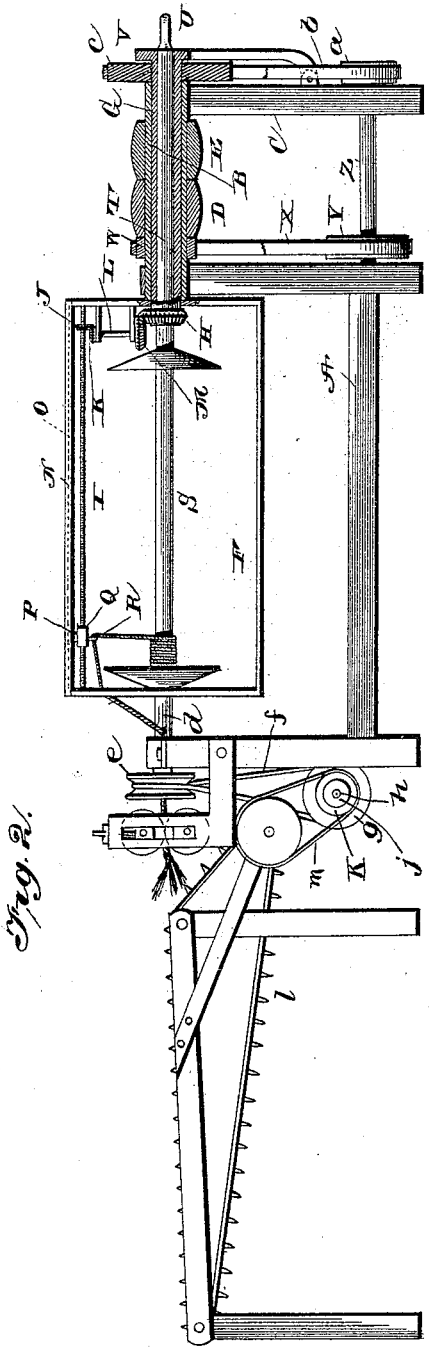

In the accompanying drawings, Figure 1 is a plan view of a machine provided with my improvements; and Fig. 2 is a view of the same, showing a part in side elevation and a part in longitudinal vertical section.

The frame A is of the usual construction, and the main driving-shaft B is mounted on one end of the same and a standard C arranged near thereto, in the manner shown in my former patent above mentioned. A fast pulley D and a loose pulley E are mounted on the said shaft, and the flier F is attached to the inner end of the same, as shown, and as will be readily understood upon reference to my aforesaid patent. The driving-shaft is hollow, as in my former patent, and a second hollow or tubular shaft G is arranged concentrically therein, and has its inner end projecting slightly within the flier and provided with a bevel-pinion H. The flier in my present machine is somewhat extended, and is of the same general construction as that shown in my former patent, a worm-shaft I being mounted and extending between the disks. This worm-shaft has a pinion J near one end which meshes with a pinion K on the end of a shaft L, said shaft L being mounted diametrically on one of the disks and provided at its inner end with a pinion M, which meshes with the pinion H. The bar N, connecting the disks of the flier, is provided with a longitudinal groove O in its inner side, and said groove is engaged by an arm P, rising from an internally-threaded sleeve Q, mounted on the worm-shaft. The said sleeve is thus prevented from being carried around by the rotation of the shaft, and consequently is forced to travel along the same. The sleeve is provided with a pulley or eye R on its lower side, through which the thread passes to the reel.

The reel S is arranged within the flier and is supported upon a longitudinal shaft or rod T, which is mounted in the hollow shaft G, as clearly shown, and has its outer end provided with a handle U, to permit its withdrawal, when so desired, and near said handle it is provided with an annular enlargement or friction-block V. A pulley W is secured on the driving-shaft near the inner end of the same, and a belt X runs over said pulley and connects it with a larger pulley Y on the inner end of a shaft Z, which is mounted in the lower portion of the frame and the standard C. On the outer end of this shaft Z, I secure a small pulley $a$, which is connected by a belt $b$ with a pulley $c$ on the outer end of the hollow shaft G. This pulley $c$, it will be noticed, bears against the friction-block V, and thereby imparts motion to the rod S and the reel carried thereby, the frictional resistance being such as to cause the reel to rotate at a less speed than the flier, so that the thread will be wound thereon.

The spindle $d$ is secured to and projects from the end of the flier, and upon the spindle I secure a grooved pulley $e$, which is connected by a belt $f$ with a pulley $g$ on a shaft $h$, mounted in brackets $i$, projecting from the frame of the machine. Pulleys $j$ $k$ are secured on this shaft, the pulley $j$ being connected with the condenser (not shown) and the pulley $k$ being connected with the gill-frame $l$ by a belt $m$. The gills will thus be operated from the spindle.

In my present machine the reel will accommodate a large quantity of thread and the same will be guided evenly and positively, so as to be wrapped smoothly around the reel. As the machine is operated the worm-shaft will be rotated and the sleeve or thread-carrier thereby caused to travel longitudinally of the machine and guide the thread to its proper place.

My present machine is very compactly arranged, and its advantages are thought to be obvious to those skilled in the art.

Having thus described my invention, what I claim, and desire to secure by Letters Patent, is—

The combination of the hollow main shaft having a fast and a loose pulley, the hollow shaft G, arranged therein, the shaft T, mounted in the shaft G, the friction-block V on the end of the shaft T, the pulley c on the end of the shaft G, adapted to bear against the friction-block, the shaft Z, arranged below the main shaft, the pulley a thereon, the pulley Y on said shaft, the pulley W on the main shaft, connections between the pulleys a and c, and connections between the pulleys W and Y, as specified.

In testimony whereof I affix my signature in presence of two witnesses.

THOMAS DOWNWARD.

Witnesses:
 ADAM HENS,
 ADAM HENS, Jr.